United States Patent [19]
Nishijima et al.

[11] Patent Number: 4,682,096
[45] Date of Patent: Jul. 21, 1987

[54] SWITCHING REGULATOR SYSTEM FOR A MOTOR DRIVING CIRCUIT

[75] Inventors: Hideo Nishijima; Takayasu Ito; Isao Fukushima, all of Katsuta, Japan

[73] Assignee: Hitachi, Ltd., Tokyo, Japan

[21] Appl. No.: 786,500

[22] Filed: Oct. 11, 1985

[30] Foreign Application Priority Data

Oct. 11, 1984 [JP] Japan ................................ 59-211329

[51] Int. Cl.4 ................................................ H02P 5/28
[52] U.S. Cl. .................................... 318/808; 318/812; 307/313; 307/315
[58] Field of Search ........................ 318/808, 810–812, 318/801, 805, 774, 799; 307/313, 315; 323/271, 282, 315

[56] References Cited

U.S. PATENT DOCUMENTS

| | | | |
|---|---|---|---|
| 3,671,833 | 6/1972 | Rakes | 307/315 X |
| 3,909,628 | 9/1975 | Muto | 323/315 X |
| 4,054,843 | 10/1977 | Hamada | 323/271 X |
| 4,443,750 | 4/1984 | Altena | 318/808 |
| 4,580,090 | 4/1986 | Bailey et al. | 323/282 X |

*Primary Examiner*—Patrick R. Salce
*Assistant Examiner*—Marc S. Hoff
*Attorney, Agent, or Firm*—Antonelli, Terry & Wands

[57] ABSTRACT

A motor driving circuit includes an equivalent power PNP transistor constituted by a Darlington connection of a small-current PNP transistor and a large-current NPN transistor, and a switching regulator of a step-down and variable type is provided between the collector of the NPN transistor and the emitter of the PNP transistor. Electric power loss in the motor driving circuit can be reduced, and the electric power required to operate the motor driving circuit can be saved.

6 Claims, 6 Drawing Figures

SWITCHING REGULATOR
1
2
3
4
5
6
7
8
9
30
A

SWITCHING REGULATOR SYSTEM FOR A MOTOR DRIVING CIRCUIT

BACKGROUND OF THE INVENTION

The present invention relates to a motor driving circuit, and in particular, to a motor driving circuit for a single-phase and a three-phase motor in which the power consumption is reduced.

In a prior art motor driving circuit, for example, as disclosed in Japanese Patent Unexamined Publication Nos. 66864/80 and 66262/80, a PNP transistor and an NPN transistor are respectively connected to opposite ends of a motor driving coil, and electric power is supplied to the motor driving coil through the PNP transistor and the NPN transistor. In forming the motor driving circuit in an integrated circuit (IC), and in particular, in forming a portion of the driving circuit shown by a dotted line block A in FIG. 1 in the integrated circuit, there exists a barrier in that it has been difficult to realize a PNP transistor capable of operating in a considerably large current region due to an increase in chip size. For this reason, usually, as shown in FIG. 1, a relatively small-sized PNP transistor 3 and a large-sized NPN transistor 4 are used by connecting them in a Darlington connection. By virture of this Darlington connection, although the effect of an equivalent PNP transistor can be obtained, in the case of the transistor 4, the collector-emitter voltage $V_{CE}$ is required to be at least as large as the base-emitter voltage $V_{BE}$ (supposing that the collector-emitter voltage $V_{CE}$ of the transistor 3 is O V.) This fact causes a problem in that when motor coils 6 and 7 are driven, particularly, at low voltages, the efficiency $\eta$ of the motor (including loss in the driving circuit) is degraded to a great extent. Here, the efficiency $\eta$ of the motor is expressed by $$\eta = \frac{\text{output}}{\text{input}} = \frac{\text{load torque} \times \text{output power}}{\text{voltage} \times \text{current}},$$

output power being proportional to load torque×rotary speed. In this case, since the voltage in the above-mentioned formula is the collector-emitter voltage $V_{CE}$ of the transistor 4, by reducing the voltage $V_{CE}$, the efficiency $\eta$ of the motor can be improved. In FIG. 1, reference numeral 1 designates a first power supply, 8 and 9 designate respectively input terminals for motor driving control signals for controlling the transistors 3, 4, and 5, and reference numeral 30 designates a second power supply.

SUMMARY OF THE INVENTION

An object of the present invention is to provide a motor driving circuit for a single-phase motor and a three-phase motor, which reduces electric power loss in the motor driving circuit, and which is operated with reduced electric power consumption to a great extent by eliminating the drawbacks in the aforementioned prior art.

A further object of the present invention is to reduce a quantity of heat generated in the motor driving circuit, and to improve the motor efficiency.

In order to achieve these objects, according to the present invention, in an equivalent power PNP transistor circuit constituted by a Darlington connection of a small-current PNP transistor and a large-current NPN transistor, a switching regulator with high efficiency is connected between the collector of the large-current NPN transistor and the emitter of the small-current transistor PNP.

BRIEF DESCRIPTION OF THE DRAWINGS

Preferred embodiments of the present invention will be described in conjunction with the accompanying drawings, in which.

DESCRIPTION OF THE PREFERRED EMBODIMENT

Figure 1:
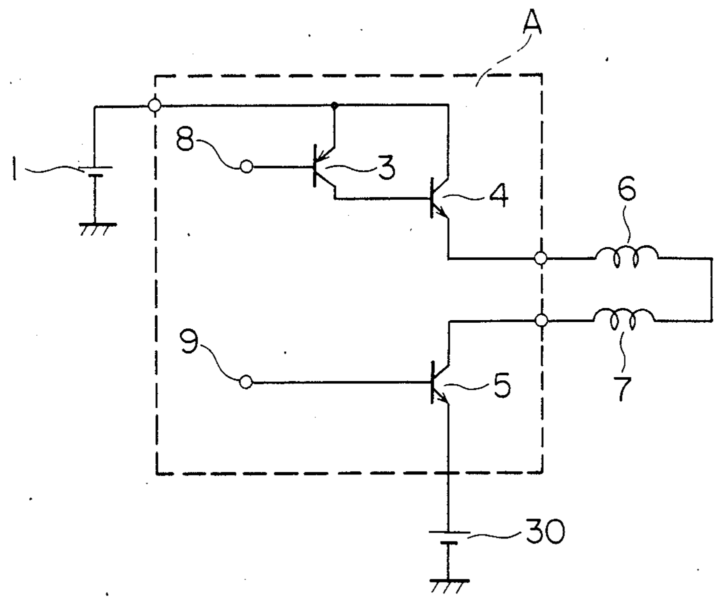
FIG. 1 is a block diagram of a prior art motor driving circuit.
Figure 2:
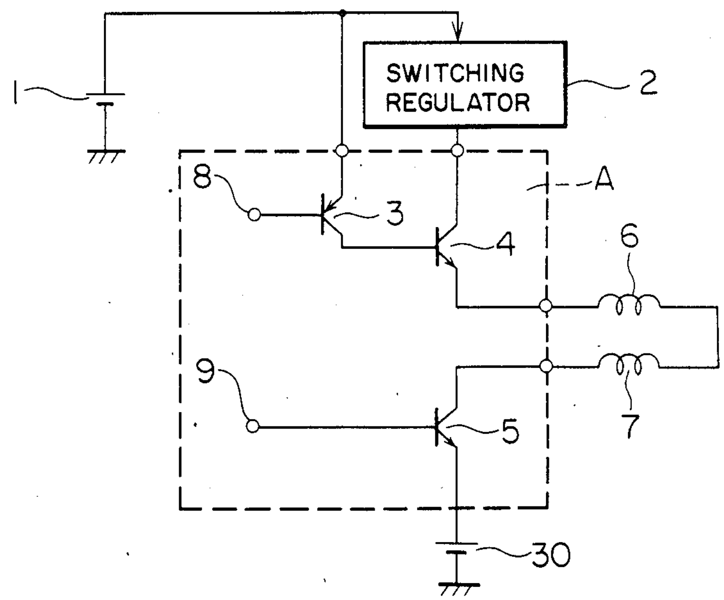
FIG. 2 is a block diagram illustrating the principles of a motor driving circuit according to the present invention.

Hereinafter, an embodiment of the present invention will be described with reference to FIGS. 2 to 6. FIG. 2 is a block diagram showing the principles of a motor driving circuit according to the present invention, and reference numeral 2 designates a switching regulator. Further, in FIG. 2, elements like those in FIG. 1 are designated with like reference numerals. In the arrangement of FIG. 2, a transistor 4 is driven in a saturation region to thereby control in an ON/OFF fashion, whereas a transistor 5 is driven in an unsaturation region to make it operate as a current supply.

Figure 3:
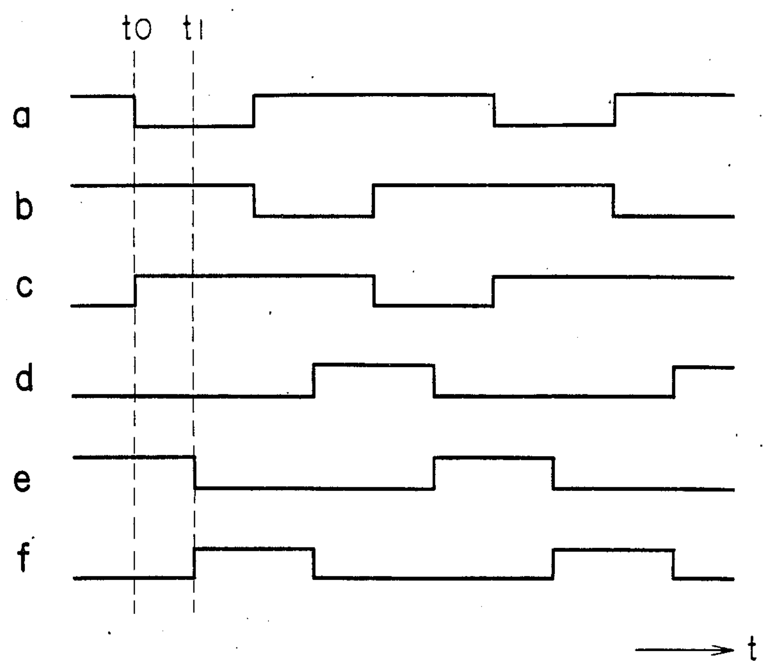
FIG. 3 is a signal waveform diagram of signals fed to the circuit of FIG. 2.

In FIG. 2, for example, in the motor driving circuit of a three-phase bidirectional energization type, input signals to be applied to input terminals 8 and 9 from a motor driving control circuit (shown in FIG. 4) are considered to be combinations of input signals a to f shown in FIG. 3. In this respect, the signals a to c correspond to input terminal 8, and the signals d to f correspond to the input terminal 9. Supposing that the signal a is inputted to the input terminal 8, and the signal e is inputted to the input terminal 9, the transistors 3, 4, and 5 (in FIG. 2) become conductive only for a time period from $t_o$ to $t_1$. As a result, a current is supplied to motor driving coils 6 and 7, and a rotor (not shown) is rotated. In this case, a switching regulator 2 connected between the emitter of the transistor 3 and the collector of the transistor 4 supplies a minimum voltage which is required for the motor driving coils 6 and 7. By such an arrangement it is possible to reduce the electric power consumption in the motor driving circuit, and to attain efficient motor driving. Furthermore, when this circuit is formed in an integrated circuit, since the power consumption is reduced, there are superior advantages in that heat generation in the integrated circuit can be reduced, and design of the package, heat sink and the like is facilitated.

Figure 4:
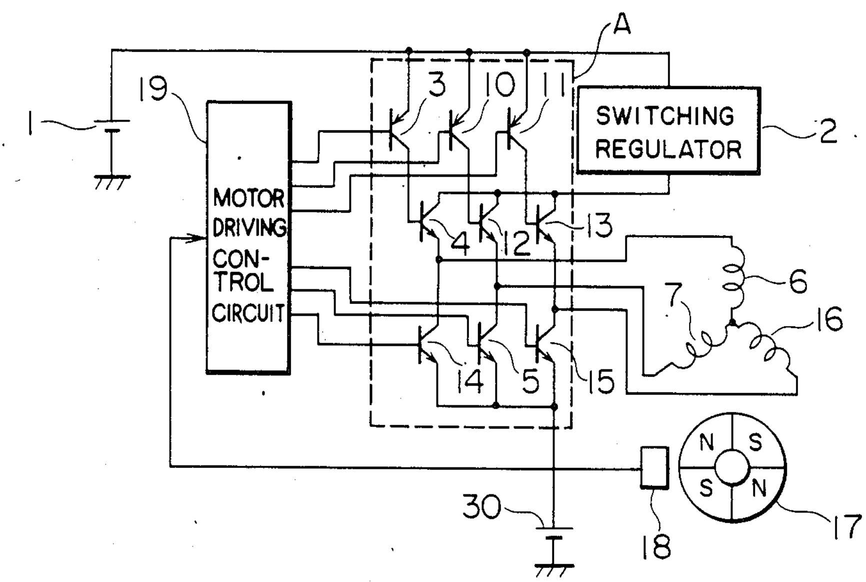
FIG. 4 is a circuit diagram showing an embodiment of the present invention.
Figure 5:
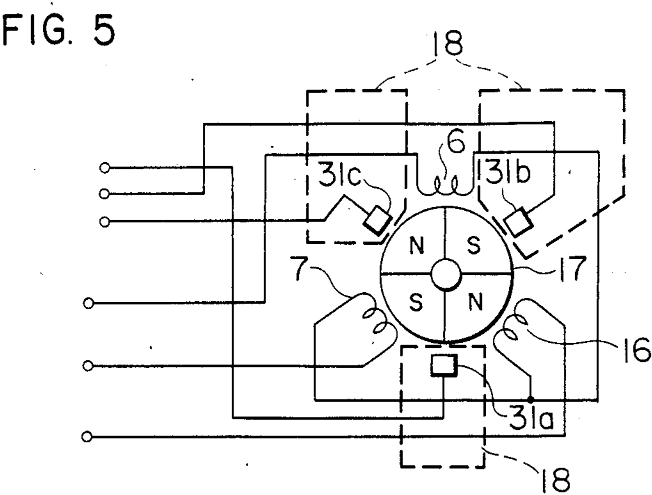
FIG. 5 is circuit diagram showing an arrangement of the position detector shown in FIG. 4.

FIG. 4 is a circuit diagram showing an embodiment of a motor driving circuit in accordance to the present invention, and illustrates an example of a motor driving cirucit of the three-phase bidirectional energization type. In this figure, like numerals refer to like parts in FIGS. 1 and 2. Reference numerals 10 to 15 designate transistors, 16 a motor driving coil, 17 a rotor magnet, 18 a position detector including Hall elements for detecting a rotational position of the rotor magnet 17, and reference numeral 19 designates a motor driving control circuit. Firstly, the three-phase bidirectional energization type will be described. The position detector 18 for detecting relative positional relationships of the rotor magnet 17 with respect to the motor driving coils 6, 7, and 16 on the stator usually includes, as shown in FIG. 5, three Hall elements 31*a*, 31*b*, and 31*c* respectively corresponding to the motor driving coils 6, 7, and 16. More specifically, in FIG. 5, each of the Hall elements 31*a*, 31*b*, and 31*c* is disposed at an angular position of 180° in mechanical angles with respect to a corresponding one of the motor driving coils 6, 7, and 16. In this instance, the rotor magnet 17 is shown as having four poles, and thus the position of each Hall element with respect to a corresponding motor driving coil is 360° (or 0°) in electrical angles. Accordingly, each of the motor driving coils 6, 7, and 16 and a corresponding one of the Hall elements 31*a*, 31*b*, and 31*c* may be disposed at the same position.

Referring to FIG. 4, the motor driving control circuit 19, in response to signals from the three Hall elements 31*a*, 31*b*, and 31*c* controls each of the transistors 3, 10, and 11 and each of the transistors 14, 5, and 15 to be turned on and off sequentially to thereby rotate the rotor magnet 17 continuously. In this case, by controlling the output voltage of the switching regulator 2 variably depending on a voltage required for the motor driving coils 6, 7, and 16, power consumption in the circuit system can be reduced.

Figure 6:
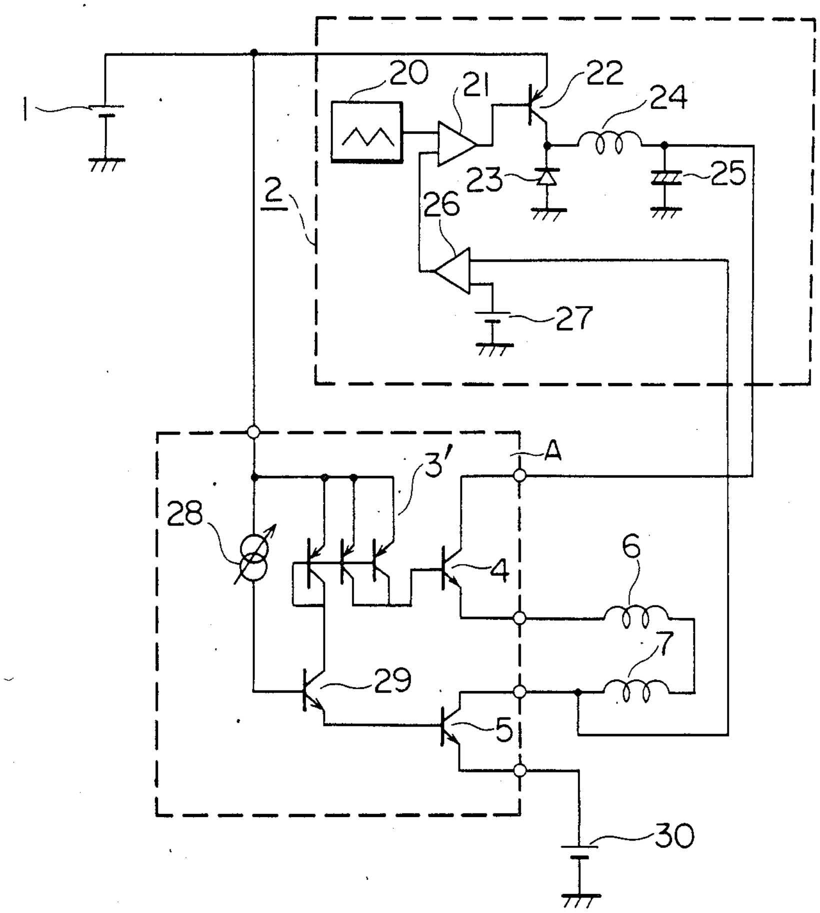
FIG. 6 is a circuit diagram showing a concrete embodiment of a switching regulator used in the present invention.

FIG. 6 is a circuit diagram of a concrete embodiment of the switching regulator shown in FIGS. 2 and 4.

In FIG. 6, like numerals designate like parts in FIGS. 2 and 4. Reference numeral 20 designates a triangular wave oscillator, 21 a comparator, 22 a transistor, 23 a diode, 24 a coil, 25 a capacitor, 26 an amplifier, 27 a reference power supply, 28 a variable current source, and 29 designates a transistor. FIG. 6 shows one condition of the three-phase bidirectional energization type shown in FIG. 4 as is the case in FIGS. 1 and 2. The output voltage of the switching regulator 2 is controlled so that a collector voltage of the transistor 5, driven in the unsaturation region, is maintained at a voltage value of a third reference power supply 27. Specifically, a voltage difference between the collector voltage of the transistor 5 and the third reference power supply 27 is amplified by the amplifier 26, and the output thereof is compared with a triangular wave output of the triangular wave oscillator 20 at the comparator 21, and a transistor 22 is controlled in an ON/OFF fashion in accordance with a pulse-width modulation (PWM) wave obtained from the comparator 21. The output of the transistor 22 is smoothed through a smoothing circuit consisting of the fly-wheel diode 23, coil 24, and capacitor 25, and a D.C. voltage is supplied to the motor driving transistor 4. The transistor 4 is driven in the saturation region and performs ON/OFF operation. Further, in order to reduce electric power loss sufficiently, the amount of base current of the transistor 4 is controlled to become, for example, about two times the amount of base current of the transistor 5. To achieve this, a collector current of the transistor 29 which controls the base current of the transistor 5 is amplified to become about two times the amount of current by means of a current mirror circuit consisting of a set of transistors 3′, and the amplified current is supplied to the transistor 4 as the base current thereof. As a result, the transistor 4 is operated in the saturation region near the unsaturation region. By this operation, power loss consumed in the set of transistors 3′ is also controlled to a minimum. Further, the speed control of the motor can be achieved by variably controlling the current flowing through the motor driving coils 6 and 7 by controlling the variable power supply 28.

While the description is made as to one phase of the three-phase input, it is entirely the same in the other two phases.

In accordance with the present invention, a highly efficient switching regulator is provided between the emitter of a PNP transistor and the collector of an NPN transistor of a motor driving circuit which includes a Darlington connection of the PNP transistor of a small-current type and the NPN transistor of a large-current type, these transistors being suitable for an integrated circuit. By virtue of this arrangement there are advantages in that heat generation in the motor driving circuit formed as an integrated circuit can be improved to a great extent due to a large reduction in power consumption in the motor driving circuit, and that efficiency of the motor can also be improved to a great extent.

We claim:

1. A motor driving circuit comprising:

a first PNP transistor having the emitter connected to a first reference power source;

a first NPN transistor having the base connected to the collector of said first PNP transistor;

a second NPN transistor having the emitter connected to a second reference power supply;

a motor driving coil connected between the emitter of said first NPN transistor and the collector of said second NPN transistor; and a switching regulator of a step-down and variable type connected between said first reference power supply and the collector of said first NPN transistor, the output voltage of said switching regulator being controlled by a collector voltage of said first NPN transistor, wherein the base of said first PNP transistor and the base of said second NPN transistor are controlled.

2. A three-phase motor driving circuit comprising:

a first set of PNP transistors respectively corresponding to a first, second, and a third phase, and having the emitters connected to a first reference power supply;

a first set of NPN transistors respectively corresponding to the first, the second, and the third phase, the base of each of said first set of NPN transistors being connected to the collector of one of said first set of PNP transistors of the corresponding phase;

a second set of NPN transistors respectively corresponding to the first, the second, and the third phase, and having the emitters connected to a second reference power supply;

three-phase motor driving coils respectively corresponding to the first, the second, and the third phase, each of said three-phase motor driving coils being connected to the junction point between the emitter of one of said first set of NPN transistors and the collector of one of said second set of NPN transistors of the corresponding phase to each other;

a switching regulator of a step-down and variable type connected between said first reference power supply and the collector of each of said first set of NPN transistors, the output voltage of said switching regulator being controlled by a collector voltage of respective ones of said first set of NPN transistors;

wherein the base of each of said first set of PNP transistors and the base of each of said second set of NPN transistors are controlled.

3. A motor driving circuit according to claim 1, wherein said switching ragulator includes an amplifier for amplifying a potential difference between a collector voltage of said second NPN transistor operating in an unsaturation region and a reference voltage of a third reference power supply, a triangular wave oscillator for generating a triangular wave output, a comparator for comparing the triangular wave output with an output of said amplifier, a second PNP transistor controlled by a pulse-width modulation wave output from said comparator in an ON/OFF fashion, and a smoothing circuit for smoothing an output of said second PNP transistor and for supplying a D.C. voltage to the collector of said first NPN transistor.

4. A motor driving circuit according to claim 2, wherein said switching regulator includes, an amplifier for amplifying a potential difference between a collector voltage of said second NPN transistor operating in an unsaturation region and a reference voltage of a third reference power supply, a triangular wave oscillator for generating a triangular wave output, a comparator for comparing the triangular wave output with an output of said amplifier, a second PNP transistor controlled by a pulse-width modulation wave output from said comparator in an ON/OFF fashion, and a smoothing circuit for smoothing an output of said second PNP transistor and for supplying a D.C. voltage to the collector of said first NPN transistor.

5. A motor driving circuit according to claim 1, wherein said first PNP transistor is formed by a current mirror connection so that a base current of said first NPN transistor is made larger than a base current of said second NPN transistor, and that the base current of said first NPN transistor is varied in proportion to the base current of said second NPN transistor.

6. A motor driving circuit according to claim 2, wherein said first PNP transistor is formed by a current mirror connection so that a base current of said first NPN transistor is made larger than a base current of said second NPN transistor, and that the base current of said first NPN transistor is varied in proportion to the base current of said second NPN transistor.

* * * * *